United States Patent
Jauch et al.

(10) Patent No.: US 8,706,318 B2
(45) Date of Patent: Apr. 22, 2014

(54) DOCKING TERMINAL AND SYSTEM FOR CONTROLLING VEHICLE FUNCTIONS

(75) Inventors: Stefan Jauch, Zimmern (DE); Gerhard Rombach, Triberg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/513,804

(22) PCT Filed: Dec. 3, 2010

(86) PCT No.: PCT/EP2010/068889
§ 371 (c)(1),
(2), (4) Date: Aug. 13, 2012

(87) PCT Pub. No.: WO2011/067397
PCT Pub. Date: Jun. 9, 2011

(65) Prior Publication Data
US 2012/0303177 A1    Nov. 29, 2012

(30) Foreign Application Priority Data
Dec. 3, 2009 (DE) .......................... 10 2009 056 786

(51) Int. Cl.
*G06F 17/00* (2006.01)

(52) U.S. Cl.
USPC .......................................................... 701/1

(58) Field of Classification Search
USPC .......................................................... 701/1
See application file for complete search history.

(56) References Cited

U.S. PATENT DOCUMENTS

| 5,917,405 A | 6/1999 | Joao |
| 6,282,491 B1 | 8/2001 | Bochmann et al. |
| 6,472,771 B1 * | 10/2002 | Frese et al. ................ 307/10.1 |
| 6,771,749 B1 * | 8/2004 | Bansal et al. ............. 379/88.17 |
| 8,369,967 B2 * | 2/2013 | Hoffberg et al. ............... 700/80 |
| 8,392,552 B2 * | 3/2013 | Alexander et al. ........... 709/224 |
| 2001/0033225 A1 * | 10/2001 | Razavi et al. ............ 340/425.5 |
| 2005/0005298 A1 * | 1/2005 | Tranchina ..................... 725/81 |
| 2005/0197747 A1 * | 9/2005 | Rappaport et al. .............. 701/1 |
| 2007/0038434 A1 | 2/2007 | Cvetko |
| 2007/0143798 A1 * | 6/2007 | Jira et al. ....................... 725/62 |

(Continued)

FOREIGN PATENT DOCUMENTS

| DE | 196 40 735 | 4/1998 |
| DE | 196 40 735 A1 | 4/1998 |

(Continued)

OTHER PUBLICATIONS

Wolf et al., "State of the Art: Embedding Security in Vehicles", 2007, EURASIP Journal on Embedded Systems.*

(Continued)

*Primary Examiner* — Mary Cheung
*Assistant Examiner* — Anne Mazzara
(74) *Attorney, Agent, or Firm* — Cozen O'Connor

(57) ABSTRACT

A docking terminal for controlling a plurality of vehicle functions of a motor vehicle by a control device connected to the vehicle, including a wireless data exchange with a control device, an input unit, and an energy store. A greater range of functions, which can also include control of safety-relevant vehicle functions, is facilitated by the connection of the wireless data exchange to a data processing system integrated in the docking terminal. The system is designed to use at least one cryptologic method.

17 Claims, 3 Drawing Sheets

(56) References Cited

U.S. PATENT DOCUMENTS

| | | |
|---|---|---|
| 2008/0027643 A1* | 1/2008 | Basir et al. ............... 701/213 |
| 2008/0103651 A1* | 5/2008 | Pillar et al. ............... 701/29 |
| 2008/0168205 A1 | 7/2008 | McCoy et al. |
| 2008/0192659 A1* | 8/2008 | Santavicca ............... 370/280 |
| 2008/0221742 A1* | 9/2008 | DiCroce ............... 701/2 |
| 2008/0244050 A1* | 10/2008 | Wong et al. ............... 709/223 |
| 2009/0058595 A1* | 3/2009 | Mainguet et al. ............ 340/5.53 |
| 2009/0096870 A1* | 4/2009 | Zheng ............... 348/148 |
| 2009/0285000 A1 | 11/2009 | McCoy |

FOREIGN PATENT DOCUMENTS

| | | |
|---|---|---|
| DE | 10 2007 038 690 A1 | 2/2009 |
| EP | 1 150 098 A1 | 10/2001 |
| JP | 2003-130669 | 5/2003 |
| JP | 2003-130669 A | 5/2003 |
| WO | WO 2009073806 A2 * | 6/2009 ............. G01C 21/36 |

OTHER PUBLICATIONS

Silex Technology "wiDock wireless dock for iPod" Jan. 1, 2006 XP007918004, www.silexameica.com/products/data_sheets/widock_datasheet.pdf.

Silex technology; "wiDock wireless dock for iPod"; located Internet: http://www.silexamerica.com/products/data_sheets/widock_datasheet.pdf; located on: Mar. 29, 2011; 2006.

* cited by examiner

DOCKING TERMINAL AND SYSTEM FOR CONTROLLING VEHICLE FUNCTIONS

CROSS REFERENCE TO RELATED APPLICATION

This is a U.S. national stage of application No. PCT/EP2010/068889, filed on 3 Dec. 2010. Priority is claimed on German Application No. 10 2009 056 786.0, filed 3 Dec. 2009, the content of which is incorporated here by reference.

BACKGROUND OF THE INVENTION

1. Field of the Invention

The invention relates to a docking terminal for holding mobile terminals, for communicating with mobile terminals, and for controlling a plurality of vehicle functions via a controller which is connected to the vehicle, having an input apparatus, a wireless data interchange, and an energy store, and a system for the mobile actuation of vehicle functions having a controller and a docking terminal.

2. Description of Prior Art

EP 1 150 09B A1 discloses a vehicle navigation system having a plurality of units coupled to one another. The units comprise an input/output unit, a route planning unit, and a position finding unit. The navigation system is designed to determine a route between a starting point and a destination by taking account of possible intermediate destinations, such as hotels or else traffic information, which can be requested using the radio data system (RDS). In addition, the navigation system also comprises a database with data about the distances between prescribed route sections, the associated probable travel period therefor and road classifications. Furthermore, the navigation system comprises a logbook computer that stores timetables from the past, accrued invoices or other costs. Depending on the information in the database, in the logbook computer and also depending on the RDS system, the navigation system is designed to ascertain the respective route from the starting point to the destination. The individual components of the navigation system may be coupled to one another via Bluetooth interfaces or else via GSM interfaces.

The English abstract JP 2003-130669-A likewise discloses a navigation system for vehicles which comprises a route planning and processing unit and an alternative route calculation unit. The route planning and processing unit is designed to ascertain a route to a set destination position. It is also designed to allocate route information on the basis of costs which are associated with the respective route sections of the respective route. Such costs are disclosed as a highway or toll road.

DE 19640735 proposes a telematics appliance in which a car radio having an RDS module, a radio telephone, a position finding, and navigation system are arranged in a housing. The housing can be fitted into the standardized slot on the dashboard of a motor vehicle. The telematics appliance can be used to receive both generally relevant information via the car radio and individual information via the GSM module. Furthermore, it is possible to send data about the vehicle position, a desired destination or an emergency call to the control center. The control center calculates one or more destination routes and returns them to the telematics appliance. In the event of an accident or a breakdown, an appropriate emergency call is sent and help is fetched.

In order to improve the security individual mobility further, it is necessary to use not only the information sources that can be fitted into a vehicle but also external information sources. This allows a more comprehensive picture of the surroundings to be obtained, since obstructed views are not a disruption and it is possible for more comprehensive information to be interchanged. Mobile radio technology in combination with further methods allows information interchange from vehicle to vehicle and vehicle to infrastructure. Current solutions have no central, mobile and wireless communication platform in the vehicle for mobile display, mobile input/output, control or unidirectional/bidirectional communication. Particularly in the case of sensitive vehicle or driver data, access protection and a firewall are important for protecting the vehicle and driver. The present systems are individual solutions which are able to download only specific data from, by way of example, the tachograph area, for example using the download key or download device.

Additional security features, according to the form depending on the required security level, are essential constituents of such an aforementioned system design for a mobile docking terminal.

Besides the information interchange over short distances, it is also always necessary for data to be interchanged with a central infrastructure, for example to send emergency calls or in order to recover stolen vehicles. This is usually accomplished by using radio telephone modules (GSM/UMTS) and satellite positioning systems (GPS/Galileo).

SUMMARY OF THE INVENTION

Based on the prior art, mobile terminals for controlling vehicle functions are already known. However, these have a relatively small scope of functions and are usually limited to added-convenience functions in the vehicle.

Such limitation is disadvantageous, since there is a need to remotely control further functions, such as the retrieval of safety-relevant vehicle functions.

There is particular disadvantage in limitation to added-convenience functions in the commercial vehicle market, since mobile terminals based on the prior art cannot be used to control any vehicle functions.

Although remote controls are also known for some vehicle functions, these are individual solutions which are suitable for controlling precisely one particular function.

An object of one embodiment the invention is to specify a docking terminal and also a system for the mobile actuation of vehicle functions that has an enlarged scope of functions.

Since the wireless data interchange is connected to an integrated data processing unit and is integrated in a docking terminal, the docking terminal can be used directly or indirectly, also using a connected mobile terminal, which is designed to use at least one cryptological method, to remotely control more vehicle functions, since it is also possible to control functions which, on the basis of the prior art, were able to be controlled only by a wired actuation or by a separate remote control, for safety reasons. Connected is intended to be understood to mean that mobile terminals are able to be inserted into the docking terminal by plugging them in or that mobile terminals are able to be connected to the docking terminal by a short range communication link, such as Bluetooth, or connected on a mobile basis.

An advantages of such an approach is a simple mechanical adaptation for the mobile terminals connected in the vehicle. Furthermore, a supply of electrical power and the provision of automotive data and communication link for mobile communication appliances in the vehicle are advantageously implemented.

The approach already mentioned allows a flexible and functional design to be implemented for a central and mobile docking terminal, particularly in the case of commercial vehicles. This allows an iPad, or other tablet device, to be carried and used within the vehicle for the purpose of communication with the vehicle and outside the vehicle for the purpose of data acquisition/output in a haulage firm.

The docking terminal according to one embodiment of the invention integrates consumer products such as smartphones or ipads into the automotive world. This allows use of HMI functionality to be adopted by inexpensive mobile communication appliances. It is possible to use the latest technology by using current communication terminals. The use of vehicle/driver data with GPS and GSM functions allows effects of synergy to be achieved and new integrated functions to be generated.

By virtue of the provision of data contents and control commands for tachographs, such as printing, cumulated driving time, data communication with internal controllers, such as cooling units, with specification of the goods details from the haulage firm, it is possible to obtain improvements and better logistical use of vehicles in fleet operation. This allows the vehicle to be individually matched to the goods or allows the devices on a tanker to be controlled directly.

An optionally additional security device, e.g. in the form of a smart card controller or an insertable SIM card, in conjunction with the tachograph system, for authentication and secure bidirectional communication allows the performance of control and transmission of critical driver data and sensitive vehicle parameters or an SW update for controller data.

Examples of controllable functions are operation of a vehicle locking system, of a crane mounted on the vehicle, of a raisable loading hatch on HGVs, of a tail lift, of a navigation system and also operation of infotainment systems, navigation systems and/or added-convenience functions. It should be pointed out that a plurality of functions means that functions of a plurality of different appliances in vehicle can be actuated.

Further controllable functions are the driver assistance and vehicle safety systems that can be found in the vehicle. The vehicle safety systems, which can be used, are all electronically controlled braking systems available in the vehicle. Vehicle safety systems may be the electronic brake system (EBS), the engine management system (EMS), antilock braking system, traction control system, electronic stability program, electronic differential lock, transmission control unit (TCU), electronic brake force distribution (EBD) and/or torque moment regulation (MSR), electrically actuable steering systems (ASF, EPS).

Driver assistance systems are electronic supplementary devices in vehicles for assisting the driver in particular driving situations. In the foreground of these there are often safety aspects but also the increase in driving convenience. These systems take semi-autonomous or autonomous action in driving, control (e.g. accelerator, brake, steering) or signaling devices in the vehicle or use suitable man/machine interfaces to warn the driver shortly before or during critical situations. Examples of such driving assistance systems are the parking assist system (sensor arrays for obstacle and distance detection), braking assistant (BAS), cruise control, adaptive cruise control (ACC), distance alert, turning assistant, tailback assistant, lane detection system, lane departure warning system (lateral guidance support, (LDW)), lane keeping support, lane change assistance, lane change support, intelligent speed adaption (ISA), adaptive cornering light, tire pressure inspection system, driver condition detection, road sign recognition, platooning, automatic emergency braking (AEB), full and dipped beam assistant for driving lights, night vision.

For wireless data interchange in the form of a WLAN based on IEEE 802.11 with all the derivatives, a ZigBee and/or Bluetooth interface may advantageously have a range between 5 m and 1 km, particularly advantageously between 10 m and 300 m. Thus, wireless data interchange with a controller integrated in the vehicle is also possible from outside the vehicle. Advantageously, a range may be dependent on a vehicle function that is to be activated, particularly such that a transmission power for the wireless data interchange is reduced for some, advantageously particularly safety-relevant, vehicle functions. As a result of the functionality of the wireless data interchange, the docking terminal may also act as what is known as a hotspot in the form of a wireless access point (WAP) in the vehicle. In one refinement, the docking terminal is able to switch as access points to the client mode, so that the docking terminal behaves in a manner of a WLAN-LAN adapter.

The cryptological methods used may preferably be security-oriented methods that are compliant with the properties of integrity, authenticity and/or confidentiality.

Advantageously, the docking terminal has a display apparatus. This means that it is possible not only to control processes but also to retrieve and display information from the vehicle. By way of example, information can be retrieved for the purpose of monitoring the execution of a vehicle function.

In one advantageous embodiment, the docking terminal contains at least one data memory. Such a memory may be a nonvolatile mass memory unit, in particular. Such a memory may advantageously be in the form of a flash memory. Particularly advantageously, the data memory is in the form of a secure data memory. In this regard, the data memory may be designed for the encrypted storage of data.

Advantageously, the docking terminal is designed to store user profiles on the data memory. The user profiles may contain settings for altering menu guidance for controlling vehicle functions. By way of example, the user can individually assign functions important to him to some keys. This results in improved matching to a requirement profile prescribed by the user for the docking terminal. Furthermore, the docking terminal may also be designed to use the user profile to additionally store information about the user which does not relate directly to the operation of the docking terminal. Thus, settings for voice control may also be stored in the user profile.

Advantageously, it is also possible for a plurality of different user profiles to be stored on the data memory. A user profile that is to be used is then advantageously requested when use of the docking terminal starts, and can also be changed over during operation.

The data memory can advantageously also be used to store updated programs and/or drivers for appliances which are integrated in a vehicle or which are connected to a vehicle. The docking terminal may advantageously be designed to transmit the drivers and/or updated programs to a controller for forwarding to a target appliance. Furthermore, the data memory can be used to store recorded tachograph data.

In a further advantageous embodiment, the integrated data processing unit of the docking terminal is designed such that it allows control not only of vehicle functions but also of functions of further apparatuses connected to the vehicle, such as the systems already mentioned. In this regard, the data processing unit is designed to transmit control commands for further apparatuses, connected to the vehicle, to a controller via the means for wireless data interchange, which controller can then forward the control commands.

Requisite control information can advantageously be stored in the docking terminal subsequently, so that it is possible at all times to match a scope of functions for the docking terminal to a scope of functions which has been altered, for example as a result of the vehicle being upgraded or additional appliances being connected. Advantageously, however, the docking terminal may already contain the requisite control commands for a multiplicity of upgradable components for the vehicle, so that a subsequent upgrade is necessary only in special cases.

In one particularly advantageous embodiment, the docking terminal is produced with a mobile terminal for controlling a vehicle locking installation, but the data processing unit is advantageously designed such that cryptological methods can be used not only when controlling a vehicle locking installation but also when controlling further vehicle functions. The docking terminal is then designed such that if the mobile terminal is removed from the vehicle then the vehicle locking installation is activated and the vehicle is protected against unauthorized entry and access.

Advantageously, the data processing unit of the docking terminal is designed to use a plurality of different cryptological methods.

By way of example, it may be designed to use symmetric and/or asymmetric encryption methods. In one advantageous embodiment, the data processing unit of the docking terminal may be designed for encryption using DES and/or RSA. This is particularly advantageously such that whenever the docking terminals are switched on a session key encrypted using an asymmetric method such as RSA is transmitted which is then used for symmetric encryption, for example using DES. An example of a method in which a message is transmitted in symmetrically encrypted form while the key is transmitted in asymmetrically encrypted form with the message is the PGP (Pretty Good Privacy) method.

Apart from the data processing unit of the docking terminal being designed to use encryption methods, there is also the intention for it to be designed for other cryptological methods. The data processing unit of the docking terminal can be designed for producing and checking digital signatures, for using hash functions and/or for using different authentication methods, such as challenge/response authentication.

Advantageously, the data processing unit may be designed to use a two-factor or three-factor authentication method. This is intended to be understood to mean that the authentication requires not only a piece of information, such as a key from an encryption method, but also simultaneously the presence of a particular object and/or evidence of a particular biometric feature.

In this regard, the docking terminal advantageously contains an additional security apparatus. This may be in the form of a smart card controller, with preferably a prescribed smart card needing to be inserted into the controller in order to transmit correctly signed control commands, particularly for security-relevant control commands. In order to achieve a particularly high level of security, use can be made of the principle of secret sharing in this context. In this regard, the docking terminal may be designed to store only a portion of a code which is needed for signing and/or encryption, with a second portion of the code being read in by the smart card controller. A further example of additional security devices are iris or fingerprint recognition systems or further biometric features.

A further possible additional security apparatus is housing protection for the docking terminal. This may be designed to recognize opening of the housing of the docking terminal and to initiate security measures which are then necessary. One such security measure may be the erasure of security-relevant data or disabling of the docking terminal.

Advantageously, a vehicle locking installation can be controlled by using a different cryptological method than for other control commands. It should be mentioned that the docking terminal does not necessarily have to be designed so that all control commands for vehicle functions are transmitted in a form encrypted by a cryptological method. On the contrary, it may be advantageous if only security-relevant control commands are transmitted in encrypted form.

In one advantageous embodiment, the data processing unit of the docking terminal is designed to actuate and activate functions of the onboard computer.

This allows systems used in the vehicle to be checked and any existing vehicle problems to be diagnosed. To this end, measured values can be retrieved from sensors installed in the vehicle. Furthermore, different user settings, for example settings for added-convenience functions of the vehicle and of the driver assistance systems, can be altered. Alternatively or in addition, the data processing unit may be designed to undertake functions of the onboard computer completely. This allows the functions to be accessed without the onboard computer itself being active.

In one particularly advantageous embodiment, the docking terminal is simultaneously in the form of a mobile telephone and/or FDA. This results in considerable savings in comparison with use of separate appliances, since many components can therefore perform a dual function. By way of example, a display apparatus, which may be in the form of a touchscreen can be used both to display SMSs, MMSs and incoming calls and to display activatable vehicle functions. In this design form, the docking terminal has a holder for the SIM card of a mobile radio operator, with which the full functionality of a mobile terminal is then rendered accessible to the docking terminal. An antenna for connection to a mobile radio network can incorporate the wireless data interchange with a controller. Overall, this results in both a cost advantage and a convenience advantage, since it is therefore unnecessary to carry an additional appliance.

Alternatively, as already mentioned, the docking terminal may be in the form of a mobile telephone or PDA. By way of example, the docking terminal may have a connection for a charger, the design with a touchpad and/or the design for use of an operating system, as known for mobile telephones and/or PDAs based on the prior art. Furthermore, as already mentioned, the docking terminal may have a holder for a SIM card. Such a holder is necessary particularly when the docking terminal is in the form of a mobile telephone.

In a further advantageous embodiment, the data processing unit is connected to at least one interface, integrated in the docking terminal, for reading and/or writing to cards and/or mobile storage media. By way of example, such an interface is used to provide the docking terminal with data which are required for controlling apparatuses freshly connected to the vehicle.

A further interface of the docking terminal may be designed to read a driver card. Such driver cards are usually used for tachographs. Since, on account of the data processing unit being designed for the use of cryptological methods, transmission is sufficiently reliable, it is no longer necessary for the driver card to be inserted into a tachograph. This simplifies the use of the tachograph, since manual access thereto can advantageously be dispensed with completely, because it is possible both for the tachograph to be controlled and for the driver card to be accessed via the docking terminal.

This also allows a more advantageous arrangement of instruments in the cockpit of commercial vehicles, since the tachograph no longer necessarily needs to be fitted at an easily accessible location. This makes space for instruments which are needed during the journey.

Furthermore, such a user profile for the docking terminal can be chosen automatically using an inserted driver card.

In addition, the docking terminal may have a USB interface. This can be used to connect the docking terminal to a computer or notebook, for example, for the purpose of transmitting data. The docking terminal has further interfaces or connections for interaction with a wired peripheral area which is in the form of a PCI and/or PCMCIA and/or PC card and/or FireWire.

A further increase in convenience is possible by virtue of the docking terminal being designed for keyless identification. Such a design as a secure "identification tool" allows a multiplicity of functions to be accessed which would otherwise require identification by a key. By way of example, it is possible for different vehicle units to be activated or deactivated. Furthermore, the docking terminal can provide access control to protected areas of the vehicle.

In one particularly advantageous embodiment, the docking terminal is designed such that the docking terminal allows identification for the purpose of making a bank connection. In this regard, the docking terminal advantageously contains an interface in the form of a bankcard reader. Payment operations, for example at filling stations, are thus significantly simplified. This reduces the time required for filling operations, which results in considerable savings when calculated over the total life of a docking terminal according to one embodiment of the invention.

Preferably, the wireless data interchange may be designed for automatic deactivation at the start of a journey. This reliably avoids any interference with the vehicle by the wireless data interchange.

The docking terminal advantageously contains a cable-based interface. This means that the docking terminal can also be connected to the controller by a direct connection. In this case, "cable-based" is not necessarily intended to be understood to mean an opening for inserting a cable connector. On the contrary, in one particularly advantageous embodiment, contacts for insertion into a docking station are provided. This allows use of the docking terminal while the wireless data interchange are deactivated. Furthermore, connectability to a docking station allows the docking terminal to be simultaneously in the form of a ignition key, since for safety reasons it would usually not be desirable to allow wireless activation of the ignition apparatus, despite encrypted transmission.

Furthermore, the invention also relates to a system for the mobile actuation of vehicle functions. Such a system contains at least a docking terminal and a controller which is connected or can be connected to the vehicle. The controller and the docking terminal are designed for data interchange with one another, with both the controller and the docking terminal being designed to use cryptological methods for the data interchange. The controller is designed to output control signals and/or other data to a target appliance depending on operation of the input apparatus of the docking terminal.

In one simple embodiment, the dependency may be such that the docking terminal transmits only information about the operation of the input apparatus to the controller in encrypted form, with the controller generating control signals based the information on. In the simplest case, the docking terminal is merely in the form of a wireless input appliance which is designed for encrypted transmission.

Preferably, however, the docking terminal is designed to produce and transmit control signals which the controller advantageously forwards just to a target appliance, said target appliance being stipulated by the docking terminal with the transmitted data and/or control signals.

In this case, a target appliance is understood to mean the appliance from which a function is intended to be retrieved by the transmitted data. If the data contain the information that the heating temperature of the seat heating needs to be increased, for example, then the target appliance would be the appliance which regulates the seat heating temperature.

It should also be mentioned that, according to one embodiment of the invention, the data and/or control signals do not necessarily have to be output directly to the target appliance. It is equally possible for control commands transmitted by the docking terminal and received by the controller to be forwarded to the target appliance via one or more interposed appliances.

Advantageously, the controller may also have additional security apparatuses, as described above for the docking terminal.

In one advantageous embodiment, the controller simultaneously contains an instrument and particularly a tachograph or is in the form of such an instrument. Particularly being in the form of a tachograph may be advantageous because tachographs have a high level of security anyway on account of legal requirements. By way of example, tachographs usually have housing protection, which records unauthorized opening of the housing, and a secure data memory.

This means that the complexity for producing a modified tachograph in the form of a controller is significantly lower than that for producing a tachograph and a separate controller.

The tachograph or the instrument may advantageously be part of a combined appliance, with the docking terminal and the controller advantageously being designed such that it is possible to retrieve functions not only from appliances that are part of the same combined appliance but also from further appliances that are not part of the same combined appliance.

In one particularly advantageous embodiment, the controller is formed by a tachograph and a module which can be disconnectably connected to a tachograph for the purpose of wireless data interchange with the docking terminal. By way of example, the interchangeable data may also comprise data for controlling the tachograph. This allows the tachograph to be operated independently of the location at which it is fitted. Furthermore, the docking terminal may have a significantly higher number of control options, for example provided by keys integrated in the docking terminal, than the tachograph. This allows functions of the tachograph to be called significantly more quickly, since operation of a single key on the docking terminal can correspond to operation of a plurality of keys on the tachograph. Furthermore, a user interface and user guidance can advantageously be reconfigured by the user himself.

Advantageously, the docking terminal can request working hours and distances traveled. Furthermore, printouts with information ascertained by the tachograph can be requested from a printer which is advantageously integrated in the tachograph. At the same time, it is possible to use a printer integrated in the tachograph for the purpose of printing any other vehicle information and/or further information that is input by the docking terminal. Advantageously, any further functions of the tachograph can also be retrieved via the docking terminal.

In one advantageous embodiment, the disconnectable connection between the module and the tachograph is in the form of a K line.

In general, a module which can be connected disconnectably to an appliance installed in the vehicle for the purpose of wireless data interchange with the docking terminal, together with the appliance itself which is installed in the vehicle, can form the controller. This results in the advantage that an appliance, which is already installed in the vehicle, can be upgraded in order to form a controller for a system according to one embodiment of the invention.

In one particularly preferred embodiment, the system contains an integrated docking terminal. The docking terminal may be designed to charge the energy store. Furthermore, the docking terminal may be designed such that connection involves the means for wireless data interchange in the docking terminal and in the controller being deactivated, with the docking terminal undertaking the task of connecting the controller for the purpose of data interchange.

The docking terminal can advantageously be connected by a cable and/or by a plug connection. Connection by placement into the docking terminal, as is known for wireless landline telephones, for example, is also possible.

Particularly preferably, the docking terminal is integrated in the controller. This avoids any need for an additional appliance.

Advantageously, the controller and the docking terminal are designed such that connection automatically involves information being read from the user profile. This information then allows the output of control signals for altering configurations for devices in the vehicle. In this context, control of any user-configurable appliances in the vehicle is conceivable. By way of example, it is possible to alter settings for the driver's seat, for the vehicle mirrors, for the voice control, for the infotainment systems, for the air-conditioning installation and for further added-convenience and commercial-vehicle functions.

This does not necessarily require the user profile, as described above, to be stored on a data memory integrated in the docking terminal. It is likewise possible for one or more user profiles also to be stored in the controller, with the current user and hence the user profile that is to be used being able to be determined automatically using a mobile terminal that is connected to the docking terminal.

In a particularly advantageous embodiment, the system contains a plurality of docking terminals, each of the docking terminals being able to be designed to store at least one user profile. Hence, user guidance and the keys that are to be used for retrieving a particular function may be dependent on the docking terminal used.

The docking terminal according to the invention is connected via at least one interface to an ECU in the vehicle, e.g. a tachograph, onboard unit or instrument/dashboard. The docking terminal has specific forms, such as, inter alia, a supply connection, communication interface and at least one mechanical retaining device for the connection and operation of a mobile communication terminal, e.g. smartphone, PDA or PC (notebook, tablet PC), to the automotive environment of the vehicle, optionally or updatably/upgradeably, such a docking terminal can be provided with least one wireless interface, such as an antenna expander and/or a security device in the form of access protection or a firewall.

A further embodiment is distinguished in that a docking terminal is provided with an additional security device which allows information access operations with controllers, such as tachographs or universal onboard units, and can be expanded, for example by virtue of reciprocal authentication, to form a locally distributed security system.

The advantages of such a design for the docking terminal are extended display/input-output/forwarding of vehicle and driver data via security devices between ECUs and mobile communication devices, e.g. by virtue of direct handling in the immediate field of view and control of the driver. This advantageously allows transfer and the reading of sensitive control parameters, e.g. for the purposes of control, diagnosis and parameterization.

A further advantage is that synergies or saving and reduction of individual HMI devices in the vehicle is effected by a central docking terminal. Furthermore, a flexible arrangement and a flexible operator control design are possible by virtue of a docking terminal arranged centrally in the vehicle in the direct region of the driver, which advantageously means a reduction in the degree of complexity of the operator control.

In a further embodiment of the docking terminal, further functionalities besides the aforementioned properties are advantageously combined, such as wide range wireless interfaces for mobile radio and/or satellite communication and/or geolocation data capture.

In one advantageous refinement of the docking terminal, the wide range wireless interfaces simultaneously selected or used may be one or more possible mobile radio networks, such as UMTS, GPRS, GSM, what are known as the 2G, 2, 5G, 3G or 4G networks or satellite communication networks, in order to activate different value-added services from the vehicle.

Geolocation data are captured by using satellite-based information from the satellite systems GLONASS and/or GPS and/or Compass and/or Galileo and/or IRNSS and/or EGNOS and/or GAGAN and/or MEAS and/or WAAS.

This combination becomes advantageous because the antennas are arranged in the docking terminal in the driver's area in optimized fashion and the data are transmitted to the tachograph, for example, via the available data interface.

On the basis of the form of the configuration and the equipment of the docking terminal, different operating states arise.

Thus, the appliance configuration, e.g. digital tachograph, docking terminal and a mobile terminal, permits the docking terminal—when the mobile terminal is plugged into the docking terminal in the manner of a smartphone—to be used as a charging station and at the same time permits the driver to use the mobile terminal to transmit driver/vehicle data to the mobile terminal and to edit said data.

In one further design variant, the mobile terminal is connected to the docking terminal by a wireless interface, and communication can be performed in the transmission/reception range of the docking terminal, wherein the insertion of the mobile terminal into the docking terminal implements the components of the integrated wireless interfaces of the docking terminal always by the mobile radio functionality of the mobile terminal when 2, 3 or 4G mobile radio links are used. This also allows what is known as a modem/expander mode for transmitting driver/vehicle data to a fixed station, e.g. to a server for a vehicle fleet, using mobile radio or via the Internet.

In this connected state of the docking terminal and the mobile terminal, it is possible to perform what is known as a remote control function for relevant vehicle units, such as a crane, tank (pumps), cooling units, directly by the mobile terminal by using the docking terminal.

In principle, the docking terminal produces a virtual wireless automotive interface, e.g. using the CAN, MOST, Flexray to port communication, control and parameterization data for secure transmission from external information sources to the vehicle.

In one embodiment, the docking terminal is used in the manner of an integrated "security device" in the form of a firewall and fulfils the functionality of access protection for the data interchange with controllers inside the vehicle, particularly with the tachograph. This results in a distributed and mobile system for the transmission and interchange of secure and bidirectional contents, transactions and commands. The docking terminal produces a virtual and secure, possibly security-certified, automotive interface, e.g. between the WLAN and CAN.

In a further embodiment of the docking terminal according to the invention, a display and an input option using keys or a touchpad in the display are in order to display or retrieve basic functionalities such as the status of the terminal. It is likewise intended to display critical information in the vehicle, said information being connected via the automotive interface.

BRIEF DESCRIPTION OF THE DRAWINGS

Exemplary embodiments of the invention are explained in more detail below with reference to FIGS. 1 to 6, in which.

DETAILED DESCRIPTION OF THE PREFERRED EMBODIMENTS

Figure 1:
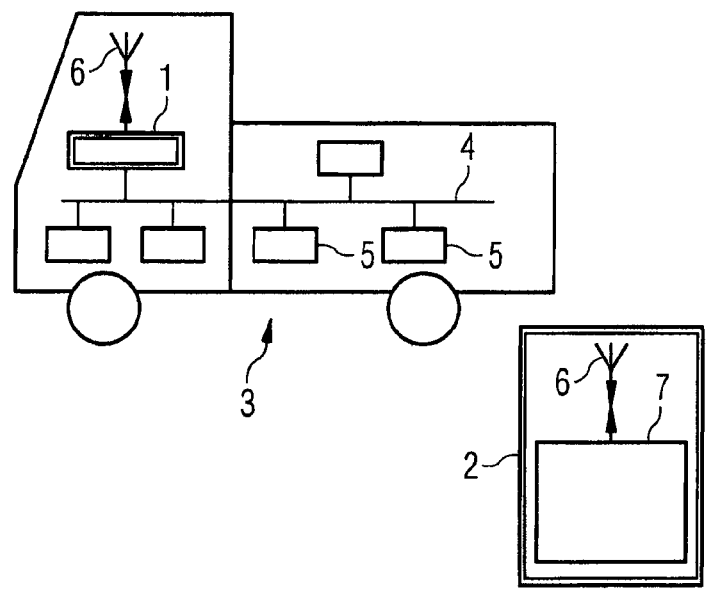
FIG. 1 is a first embodiment of a system according to the invention in the state when fitted in a vehicle.

FIG. 1 shows a first embodiment of a system according to one embodiment of the invention for the mobile actuation of vehicle functions. The system comprises a secure controller 1 and a docking terminal 2. The controller 1 is integrated in the vehicle 3 and is connected to a plurality of further controllers 5 by a bus system 4 integrated in the vehicle, said further controllers 5 usually having no security functions, such as supporting encrypted data transmission. Both the controller 1 and the docking terminal 2 respectively incorporate a data processing unit, DPU 8 in FIG. 2, designed for the cryptological encryption and decryption of data, for example using an RSA or DES method, and also a wireless data interchange. In the present exemplary embodiment, the wireless data interchanges are in the form of a WLAN antenna 6 and have a range of 300 m, which means that vehicle functions can be activated by the docking terminal 2 even from outside the vehicle. Similarly, it would be possible for the wireless data interchange to be in the form of a ZigBee or Bluetooth interface. Furthermore, the docking terminal 2 contains an input apparatus and a display apparatus, which in the present exemplary embodiment are in combined form as a touchscreen 7.

The touchscreen 7 is able to display information, for example regarding the vehicle state, which can be retrieved by the docking terminal 2 via the controller 1.

In a simplified embodiment, the docking terminal 2 may be produced without a display apparatus. In such embodiments, display is instead effected by a display apparatus which is advantageously integrated in the controller 1.

The docking terminal 2 is designed to take inputs from a user using the touchscreen 7 as a basis for transmitting control commands, which are encrypted by a cryptological method and/or are provided with a signature or are unencrypted, to the controller 1. The commands are forwarded from the controller 1 to the various further controllers 5, said forwarding usually taking place in unencrypted and unsigned form.

If a user gives the instruction to switch off an antilock braking system (ABS) in the vehicle, for example, then the appropriate safety-relevant control command is transmitted in encrypted form and/or with a digital signature, which assures the authenticity of the docking terminal and/or of a user, to the further control unit 5 that is designed to control the ABS. As a result, it is impossible for unauthorized parties to change this safety-relevant function without authorization by using a similar document terminal, for example from an identical production series.

If, by contrast, a user gives the command to switch on an air-conditioning installation that is in the vehicle in order to produce a pleasant interior temperature before entering the vehicle, the output is advantageously provided in unencrypted form via the antenna 6.

The docking terminal 2 is additionally designed for keyless operation of the vehicle locking system, for which purpose it advantageously contains an RFID chip. The latter is likewise designed to perform an encryption method, this possibly being a different method that is not used by the data processing unit.

Alternatively, it is also possible for the vehicle locking installation to be operated by the docking terminal 2 using the controller 1 without the presence of a separate RFID chip for this purpose. It is particularly advantageous that the data processing unit is designed to output control commands for operating the vehicle locking system from the docking terminal 2 to the controller 1 at reduced transmission power using the wireless data interchange, since this reduces the range from which the vehicle locking system can be activated. This makes it more difficult to track down the vehicle using a stolen docking terminal 2.

The controller 1 is designed to manage the incoming control commands and to forward them to the further controllers 5 via the bus system 4. Therefore, the controller 1 performs a server function. Furthermore, the docking terminal 2 may be designed to output control commands for apparatuses which are connected to an interface in the vehicle and which are not part of the vehicle, with the controller 1 being designed to forward the control commands to the aforementioned interface.

In alternative embodiments, an allocation of tasks between the docking terminal 2 and the controller 1 may have been shifted, such that the docking terminal transmits no complete control commands but rather merely information about instances of operation of the input apparatus in the form of a touchscreen 7 to the controller 1. In such embodiments, the actual control commands are produced by the controller 1.

In the present exemplary embodiment, transmission in both directions, that is to say from the docking terminal 2 to the control unit 1 and vice versa, is possible. The means for wireless data interchange are thus both in the form of a transmitter and in the form of a receiver. This allows the docking terminal to be used to retrieve information about the vehicle.

Figure 2:
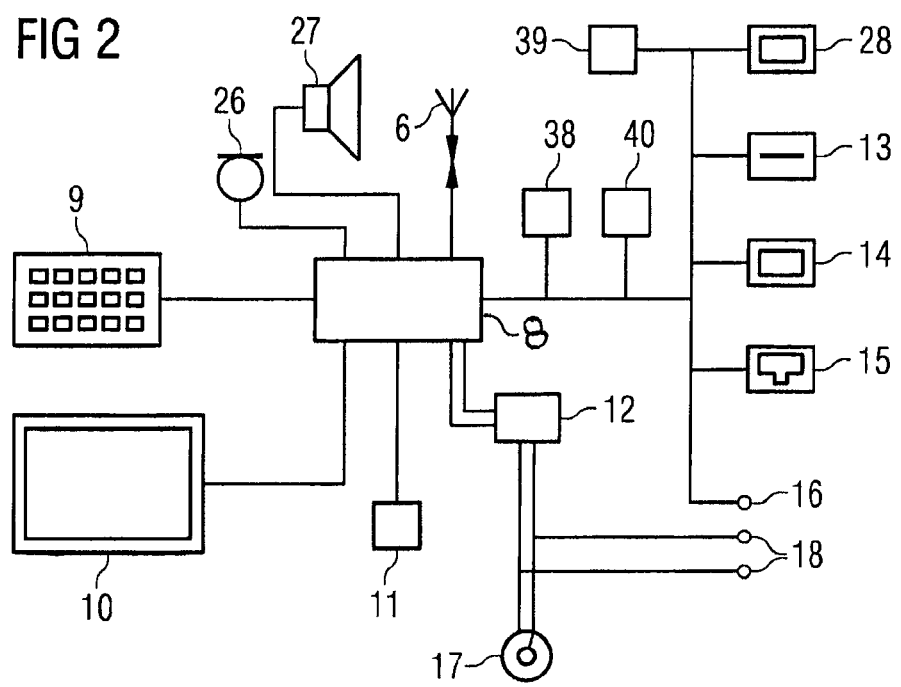
FIG. 2 a docking terminal in a second embodiment of the invention.

FIG. 2 shows a schematic illustration of the design of a docking terminal in accordance with a second embodiment of the invention. The docking terminal contains a data processing unit 8. Connected to this are an input apparatus 9, a display 10, wireless data interchange, for example in the form of an antenna 6, a data memory 11, an energy store 12 and also a microphone 26, a loudspeaker 27 and an interface 28 for reading a SIM card. Furthermore, the data processing unit 8 may be connected to a chip card reader 13, a USB port 14, a connection 15 for an RJ-45 plug connection, a fingerprint detector 38, a smart card controller 39, a housing intrusion sensor 40 and contacts 16 for the data link to a docking station.

The energy store 12 is connected to a connection 17 for a charging cable, and also to contacts 18 for charging via a docking station.

In this exemplary embodiment, the data processing unit 8 is designed to have a high computation capacity. This allows the data processing unit 8 to have a portion of the scope of functions or else the complete scope of functions of the onboard computer in the vehicle. By way of example, these include the retrieval of measured values from sensors integrated in the vehicle and the configuration of different added-convenience functions.

Furthermore, the data processing unit 8 is designed to perform data and signal processing steps necessary for mobile telephony. In addition, the antenna 6 is designed for connection to a mobile radio network. The docking terminal 2 advantageously has the complete scope of functions of mobile telephones which are known on the basis of the prior art, as a result of which the docking terminal completely replaces a conventional mobile telephone.

Furthermore, the data processing unit 8 is designed to transmit control commands with a digital signature to the controller, with control commands for safety-relevant vehicle functions being accepted by the controller 1 preferably only in correctly signed form. The digital signature can advantageously be produced completely only if a fingerprint from a person authorized to use the docking terminal 2 has been recognized by the fingerprint detector 38. In particular, the signature may contain data about the recognized fingerprint. As a result, the signature may require data that is not stored on the docking terminal itself, as a result of which a stolen docking terminal cannot be used to control safety-relevant vehicle functions.

Alternatively or in addition, the production of a signature may require data stored on a smart card which are able to be read in by the smart card controller 39.

A portion of the data required for producing a signature may furthermore be stored on the docking terminal. This data can advantageously be erased automatically when the housing intrusion sensor 40 detects inadmissible opening of a housing of the docking terminal 2. This also prevents manipulation of the docking terminal.

In the present exemplary embodiment, the data memory 11 is in the form of a flash memory and particularly in the form of a secure data memory, with the data processing unit 8 being designed for encrypted storage on the data memory 11.

The data memory advantageously stores an operating system that can be used by the data processing unit. Menu guidance for activating vehicle functions, and further properties of the user interface, can be configured as desired by the user and can be stored in a user profile which is stored on the data memory 11.

Furthermore, a user can store presets for vehicle functions in the user profile. These presets for vehicle functions can then advantageously be transferred to the controller 1 when desired by the user, said controller then forwarding appropriate control commands to the further controllers 4.

By way of example, the driver's seat and the settings for the vehicle mirrors can be automatically customized to the driver. Furthermore, speaker data for voice control can be automatically loaded from the user profile and transmitted to a voice controller which is present in the vehicle. It is also possible for a preselection of stored radio stations to be loaded from the user profile.

Such automatic configuration of the vehicle affords advantages particularly when the driver of a vehicle changes frequently, as is the case in companies with a large number of vehicles of the same type, in which case, for reasons of workload, it is not possible to ensure that the same driver always uses the same vehicle. In such areas of use, automatic configuration of the vehicle saves the working hours which are otherwise necessary for manual configuration, which is why use of a system configured as described above affords substantial economic advantages.

It is also possible for a plurality of user profiles to be stored on the data memory 11. A user profile can then be selected when the docking terminal is switched on, and said selection can be subsequently changed during operation when desired by the user.

In addition to the operating system and the user profiles, it is also possible for further data, for example tachograph data, further vehicle-related data, data for controlling further vehicle functions and/or drivers and improved programs for the controller 1 or for further controllers 5, to be stored on the data memory 11.

It is advantageous for the data memory 11 also to be able to be accessed via the USB interface 14, the RJ-45 interface 15 or the chip card reader 13. This allows the installation of improved and/or extended control commands, for example, on the docking terminal, which subsequently has a further-enhanced scope of functions.

Figure 3:
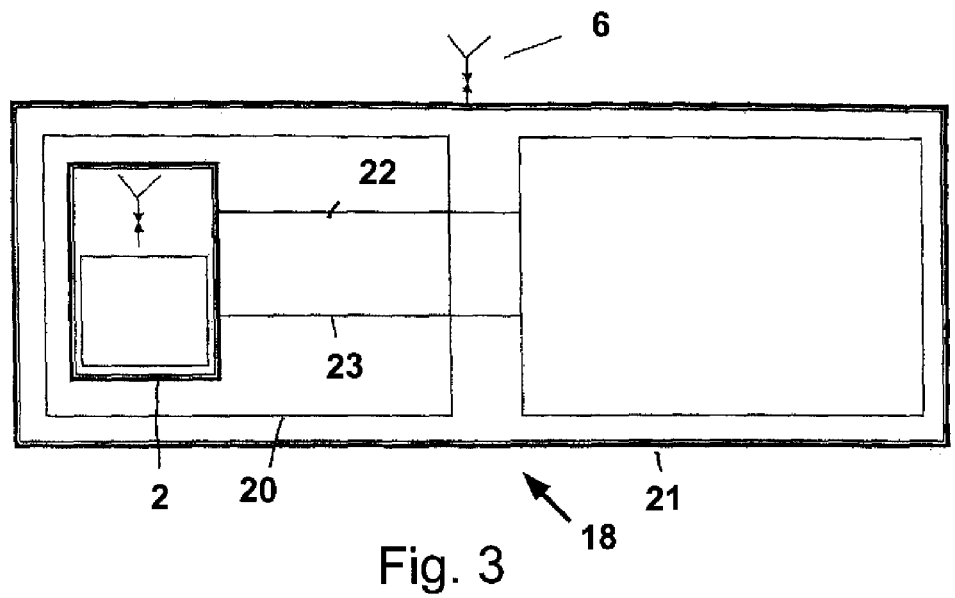
FIG. 3 is a third system according to the invention with a docking terminal integrated in a controller.
Figure 4:
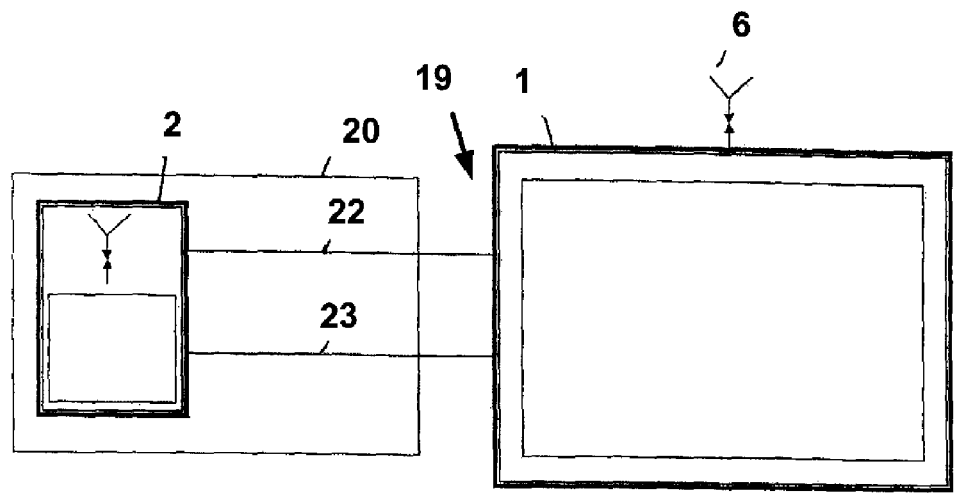
FIG. 4 is a fourth system according to the invention with a separate docking terminal.

In the embodiments shown in FIGS. 3 and 4, systems 18, 19 for the mobile actuation of vehicle functions are shown. Both systems respectively contain a docking terminal 20. The two systems differ in that in the embodiment shown in FIG. 3 a docking terminal 20 that is integrated in the controller 21 is used, whereas in FIG. 4 a separate docking terminal 21 is connected to the controller 1 by a power connection 22 and a data link 23.

In both embodiments, the wireless data interchanges in the form of an antenna 6 are automatically at least partially deactivated when the mobile terminal is inserted into the docking terminal 21, in which case the function of said wireless data interchange, namely the setup of a link for transmitting data between the docking terminal 2 and the controller 1, 21, is undertaken by the data link 23. A portion of the wireless data interchange which is used for connection to a mobile radio network can remain activated. If a mobile radio antenna fitted to the outside of the vehicle is connected to the controller 1, 21, this portion of the wireless data interchange can also be deactivated.

Furthermore, when the mobile terminal 2 is inserted into the docking terminal 20, the settings stored in a user profile are automatically transmitted to the controller 21, 1, as a result of which the vehicle can be preconfigured as described above.

In addition, the docking terminal 20 can be used to set up a connection to a hands-free device which is present in the vehicle, which means that a separate docking terminal for a mobile telephone becomes unnecessary.

Furthermore, the mobile terminal can replace an ignition key, and the docking terminal can replace an ignition lock, such that starting of the vehicle can be enabled by the mobile terminal as soon as the mobile terminal is connected to the docking terminal.

Figure 5:
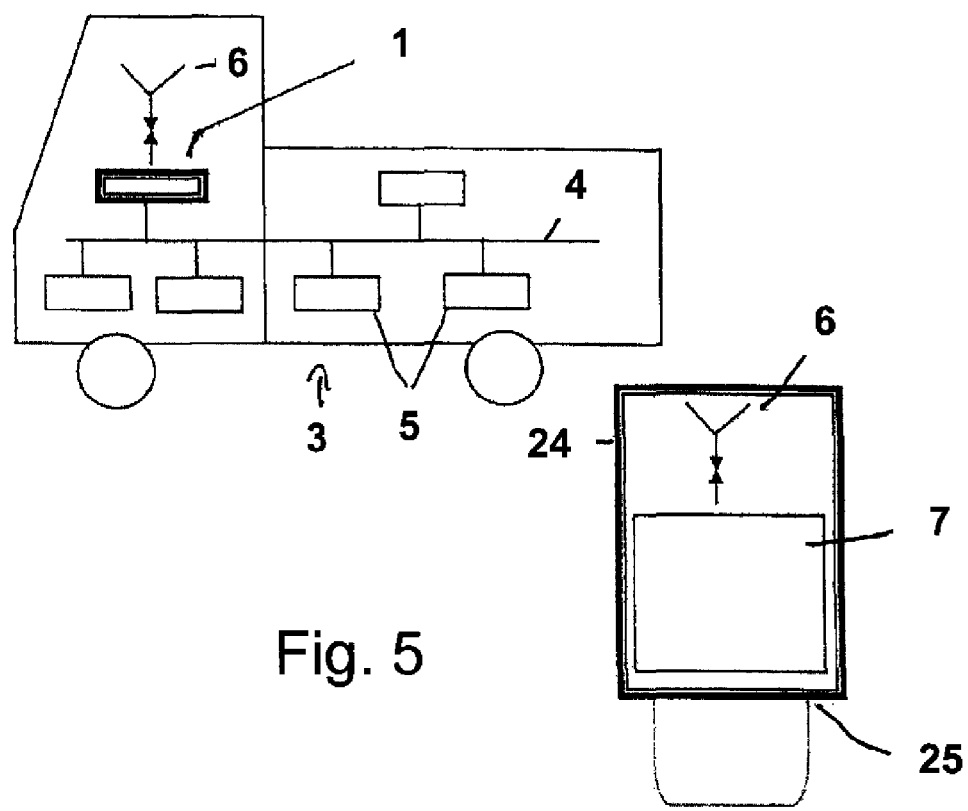
FIG. 5 is a fifth exemplary embodiment of the invention.

FIG. 5 shows an embodiment of the invention in which the docking terminal contains an additional interface. In the present exemplary embodiment, the additional interface is in the form of an ISO7816 interface 25 for reading and/or writing to chip cards. In particular, the interface 25 is able to read driver cards, inspection cards, bank cards and/or vehicle fleet cards. Depending on the inserted card, different additional functions can be enabled. When a driver card is inserted into the interface 25, it is possible to access data relating to the same driver, for example, which data would otherwise be retrievable via a tachograph when a driver card is inserted. If a bank card is inserted, payment transactions can be handled via the docking terminal. If the docking terminal is in the form of a mobile telephone with Internet access or if used in combination with a vehicle which contains a wireless Internet connection, mobile online banking is also possible.

In a further embodiment, actuation and/or configuration of particular further controllers 5 is made possible only upon insertion of particular chip cards into the interface 25. By way of example, access to control for a crane structure associated with the vehicle and/or for cooling units and/or audio installations may be possible only if a chip card provided specifically for this purpose has been inserted into the interface 25.

Similarly, it may be advantageous for a particular chip card to have to be inserted in order to enable any of the control options for the docking terminal 24. These control options may also include the operation of a locking installation for the vehicle. This is particularly advantageous because it reduces the risk of vehicle theft or unauthorized access to the vehicle in the event of the docking terminal being lost or stolen, since the vehicle can be opened only with the docking terminal in combination with the chip card.

Alternatively, insertion of a particular chip card may be required only for the software update for further controllers 5.

If the inserted chip card is person-specific, the insertion of said chip card implies the use of the docking terminal by a particular person. Therefore, a user profile associated with this person can be automatically loaded. An example of such a person-specific chip card is a driver card.

Figure 6:
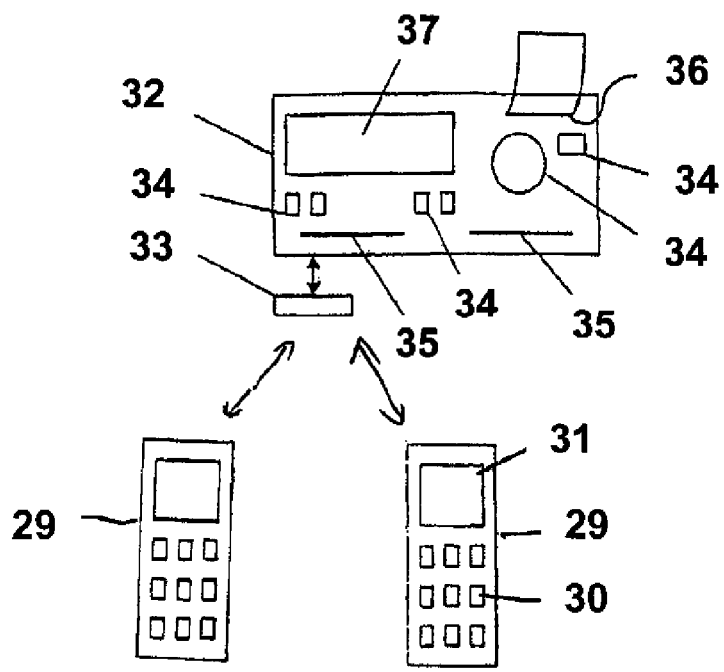
FIG. 6 is a sixth embodiment of the invention.

FIG. 6 shows a further exemplary embodiment of a system according to the invention. This system comprises two docking terminals 29 which contain an input panel 30 and a display 31 and may otherwise each be designed in the manner of the docking terminal from the first exemplary embodiment, and also comprises a controller that comprises a tachograph 32 and a reception module 33, which is connected to the tachograph 32 by means of a K line. In one embodiment, the tachograph 32 may be a conventional tachograph as is known on the basis of the prior art. Alternatively, a tachograph or instrument cluster with an integrated reception module can be used as controller.

The tachograph 32 has a plurality of operator control elements 34, interfaces 35 for driver and/or vehicle fleet cards, a printer 36 and a display 37. Both docking terminals are respectively designed to control all the functions of the tachograph 32 and are additionally used for controlling a plurality of further vehicle functions as described in the exemplary embodiments above. In this exemplary embodiment, the tachograph 32 is used as a server.

The input panels 30 of the docking terminals 39 each contain a larger number of operator control elements than the tachograph 32, as a result of which it is possible for tachograph functions to be called by the docking terminals advantageously by a reduced number of instances of operation of operator control elements.

The printer 36 integrated in the tachograph 32 can be actuated by the docking terminal 29, and it is also possible for arbitrary data which do not relate to the tachograph to be printed. By way of example, the docking terminal can be used to start a self-check for a plurality of appliances installed in the vehicle, with the results being able to be printed by the printer 36.

The specified drawings annex shows different forms of expansion for such an architecture by way of example. The implementation can be made in a large number of possible intermediate variants. The central element is the fixed vehicle interface with a connection to the tachograph via an automotive interface.

In a further embodiment, the docking terminal is configured as remote keyless entry and has all the interfaces and protection and security components described in the embodiments above in integrated form.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A docking terminal for holding a mobile terminal that controls a plurality of vehicle functions of a motor vehicle via respective controllers that are connected to the vehicle, the docking terminal comprising:
   a housing;
   a wireless data interchange coupled to a data processing unit integrated in the mobile terminal that uses at least one cryptological method;
   an input apparatus configured to provide input for the plural vehicle functions; and
   an energy store to power the docking terminal,
   wherein the data processing unit is connected to at least one additional security apparatus integrated in the docking terminal, the additional security apparatus comprising housing protection, the housing protection being adapted to recognize opening of the housing and initiate at least one security measure, wherein the at least one security measure comprises at least one of erasure of security-relevant data and disabling of the docketing terminal.

2. The docking terminal as claimed in claim 1, wherein the docking terminal has an integrated display apparatus.

3. The docking terminal as claimed in claim 1, wherein the docking terminal comprises a data memory.

4. The docking terminal as claimed in claim 3, wherein the one of the cryptological methods is used exclusively for transmitting control commands for operating a vehicle locking system.

5. The docking terminal as claimed in claim 1, wherein the data processing unit is configured to transmit control commands for further apparatuses that are connected to the vehicle via the wireless data interchange.

6. The docking terminal as claimed in claim 1, wherein the data processing unit is designed to use the at least one cryptological method not exclusively for transmitting control commands for operating a vehicle locking system.

7. The docking terminal as claimed in claim 1, wherein the data processing unit at least one of actuates and activates functions of an onboard computer and undertakes functions of the onboard computer.

8. The docking terminal as claimed in claim 1, wherein the docking terminal is at least one of a mobile telephone and a PDA.

9. The docking terminal as claimed in claim 1, further comprising an interface, integrated in the docking terminal, connected to the data processing unit configured to one or more of read and write to one or more of cards and mobile storage media.

10. The docking terminal as claimed in claim 9, wherein the interface is a reading unit for reading driver cards.

11. The docking terminal as claimed in claim 1, wherein the docking terminal is configured for keyless identification.

12. The docking terminal as claimed in claim 1, wherein the wireless data interchange is configured for automatic deactivation in driving mode.

13. A system for mobile actuation of vehicle functions comprising:
   a docking terminal having:
      a housing;
      a wireless data interchange connected to a data processing unit integrated in a mobile terminal that uses at least one cryptological method;
      an input apparatus; and
      an energy store, wherein the data processing unit is connected to at least one additional security apparatus integrated in the docking terminal, the additional security apparatus comprising housing protection, the housing protection being adapted to recognize opening of the housing and initiate at least one security measure, wherein the at least one security measure comprises at least one of erasure of security-relevant data and disabling of the docketing terminal; and
   a controller, which is one of connected and connectable to the vehicle, for data interchange with the docking terminal using cryptological methods,
   wherein the controller outputs control signals to target appliances based on operation of the docking terminal.

14. The system as claimed in claim 13, wherein the controller is at least one of an instrument and a tachograph, wherein the at least one of the instrument and the tachograph is part of a combined appliance.

15. The system as claimed in claim 14, wherein the mobile terminal and the docking terminal are configured to be connected to one another by a one or more of a cable and a plug connection.

16. The system as claimed in claim 13, wherein the system comprises the docking terminal configured as one of an instrument, a tachograph, and a controller.

17. The system as claimed in claim 13, wherein the system contains at least two docking terminals.

* * * * *